United States Patent
Shao et al.

(10) Patent No.: US 10,170,929 B2
(45) Date of Patent: Jan. 1, 2019

(54) POWER NODE COMMUNICATION FOR DEVICE DETECTION AND CONTROL

(71) Applicant: Analog Devices Global, Hamilton (BM)

(72) Inventors: Bin Shao, Andover, MA (US); Yanfeng Lu, Shanghai (CN); Scott D. Biederwolf, Andover, MA (US)

(73) Assignee: Analog Devices Global, Hamilton (BM)

( * ) Notice: Subject to any disclaimer, the term of this patent is extended or adjusted under 35 U.S.C. 154(b) by 51 days.

(21) Appl. No.: 15/012,108

(22) Filed: Feb. 1, 2016

(65) Prior Publication Data

US 2017/0201091 A1 Jul. 13, 2017

Related U.S. Application Data

(63) Continuation of application No. PCT/CN2016/070340, filed on Jan. 7, 2016.

(51) Int. Cl.
*H02J 1/10* (2006.01)
*H02J 7/34* (2006.01)
*H02J 7/00* (2006.01)

(52) U.S. Cl.
CPC ....... *H02J 7/345* (2013.01); *H02J 2007/0001* (2013.01)

(58) Field of Classification Search
CPC ..................................................... H02J 7/345
See application file for complete search history.

(56) References Cited

U.S. PATENT DOCUMENTS

| 5,986,539 A | 11/1999 | Johansson et al. |
| 2006/0097705 A1* | 5/2006 | Cheung ................. H02M 3/156 323/222 |
| 2010/0118983 A1 | 5/2010 | Weber et al. |

OTHER PUBLICATIONS

Singh, Minder, et al., "DC Power-Line Communication Reference Design", (Oct. 2013), 47 pgs.

* cited by examiner

*Primary Examiner* — Daniel Puentes
(74) *Attorney, Agent, or Firm* — Schwegman Lundberg & Woessner, P.A.

(57) ABSTRACT

Apparatus and techniques described herein can include a load circuit comprising a direct current (DC) input terminal, and a source circuit comprising a direct current (DC) output terminal coupled to the DC input terminal of the load circuit. The source circuit can include a source control circuit configured to provide a current-limited DC output voltage and monitor the current-limited DC output voltage to detect an authentication signal provided at the DC output terminal by the load circuit, the load circuit configured to modulate the voltage at the DC output terminal using a pull-down circuit. The load circuit can be configured to compare the supply voltage at the DC input terminal to a reference voltage and, in response, energize other portions of the load circuit when the input current provided the DC input terminal is sufficient as indicated at least in part by the comparison.

20 Claims, 6 Drawing Sheets

POWER NODE COMMUNICATION FOR DEVICE DETECTION AND CONTROL

CLAIM OF PRIORITY

This application is a continuation under 35 U.S.C. § 111(a) and claims benefit of priority to International Patent Application Ser. No. PCT/CN2016/070340, filed on Jan. 7, 2016, which is hereby incorporated by reference herein in its entirety.

BACKGROUND

Electronic devices can be modular, and can include hardware interfaces such as to allow an electronic module to receive operating energy from a source device. According to various applications, the source device can include a power supply such as to provide operating energy for a load device such as an embedded electronic system, a computer such as a laptop or desktop computer, a tablet device, a mobile phone, or one or more other devices. In other applications, a load device can include one or more devices such as a smart card, a peripheral device, a biological test specimen such as an electrochemical test strip, or another device.

Generally, the load device receives operating energy using one or more power input terminals. The power input terminals of the load device can be coupled to the source device using an electrical connector or other hardware interface. Separately, the load device can include a communication interface, such as using one or more communication interface terminals to provide a conductive communication interface separate from the power input terminals. Alternatively, the load device need not include any communication circuitry.

In one approach, the source device delivers the full available operating energy to the load device, such as upon physical connection between the source and load devices, without receiving communication from the load device. As an illustrative example, in a "hot swap" arrangement, power may be made available by the source device at one or more output terminals prior to, or immediately upon interconnection of the source device with the load device through a hardware interface. An inrush current provided to the load device may be limited, but such limiting is generally independent of any communication from the load device to the source device.

OVERVIEW

The present inventors have recognized, among other things, that a load device can use a direct current (DC) power input terminal to communicate with a source device without requiring a separate communication interface. Such communication can be referred to generally as "power node communication" (PNC). PNC can be used to facilitate device detection, such as to provide an authentication signal from a load device to a source device. For example, a source device providing a DC output to the load device can receive the authentication signal from the load device via a power supply node, and, in response to the authentication signal, the source device can respond in a variety of manners, according to various examples.

For example, the source device can provide the DC output initially in a current-limited manner such as to provide a small proportion of the normal operating current consumed by the load device. The load device can include a low-power communication circuit configured to signal the source device such as by pulling down a DC power node (e.g., shunting the node to cause a detectable change in the node voltage or the source current) to provide an authentication signal or other communication to the source device. If a valid authentication signal is received by the source device, the source device can disable current limiting, or provide output power having a higher current limit. If an invalid or no authentication signal is received, the source device can remain operational in a current-limited mode, or even shut down the load device by disabling the DC output. As an illustrative example, the current-limited mode during authentication can be limited to a current insufficient to cause harm in a medical application, such as having a magnitude of about 100 microamperes or less.

Apparatus and techniques described herein can include a load circuit comprising a direct current (DC) input terminal, and a source circuit comprising a direct current (DC) output terminal coupled to the DC input terminal of the load circuit. The source circuit can include a source control circuit configured to provide a current-limited DC output voltage and monitor the current-limited DC output voltage to detect an authentication signal provided at the DC output terminal by the load circuit, the load circuit configured to modulate the voltage at the DC output terminal using a pull-down circuit. The load circuit can be configured to compare the supply voltage at the DC input terminal to a reference voltage and, in response, energize other portions of the load circuit when the input current provided the DC input terminal is sufficient as indicated at least in part by the comparison.

In an example, a load device can include a direct current (DC) input terminal, an energy storage device, a first switch coupled between the DC input terminal and the energy storage device, a rectifier coupled across the first switch and oriented to permit current to flow from the DC input terminal across the first switch to charge the energy storage device but inhibiting current flow in the opposite direction, a second switch coupled between the DC input terminal and a reference node and a load control circuit. The load control circuit can be configured to sense application of a supply voltage to the DC input terminal and, in response, modulate the supplied voltage using the second switch to shunt current between the DC terminal and the reference node to provide an authentication signal to a source of the supply voltage provided at the DC input terminal, and compare the supply voltage at the DC input terminal to a reference voltage when the second switch is closed and, in response, to control the first switch to close, energizing other portions of the load device when the input current provided the DC input terminal is sufficient to power the other portions of the load device as indicated at least in part by the comparison.

In an example, a source device can include a direct current (DC) output terminal, an energy storage device, a first switch coupled between the DC output terminal and the energy storage device, a second switch arranged to couple the DC output terminal to the energy storage device through a current limiting circuit, and a source control circuit. The source control circuit can be configured to provide a current-limited DC output voltage to the DC output terminal using the second switch and the current limiting circuit, monitor the current-limited DC output voltage to detect an authentication signal provided at the DC output terminal by a load circuit, the load circuit configured to modulate the voltage at the DC output terminal using a pull-down circuit, and, in response to detecting the authentication signal provided by the load circuit, closing the first switch to bypass the current limiting circuit.

This overview is intended to provide an overview of subject matter of the present patent application. It is not intended to provide an exclusive or exhaustive explanation of the invention. The detailed description is included to provide further information about the present patent application.

Figure 1:
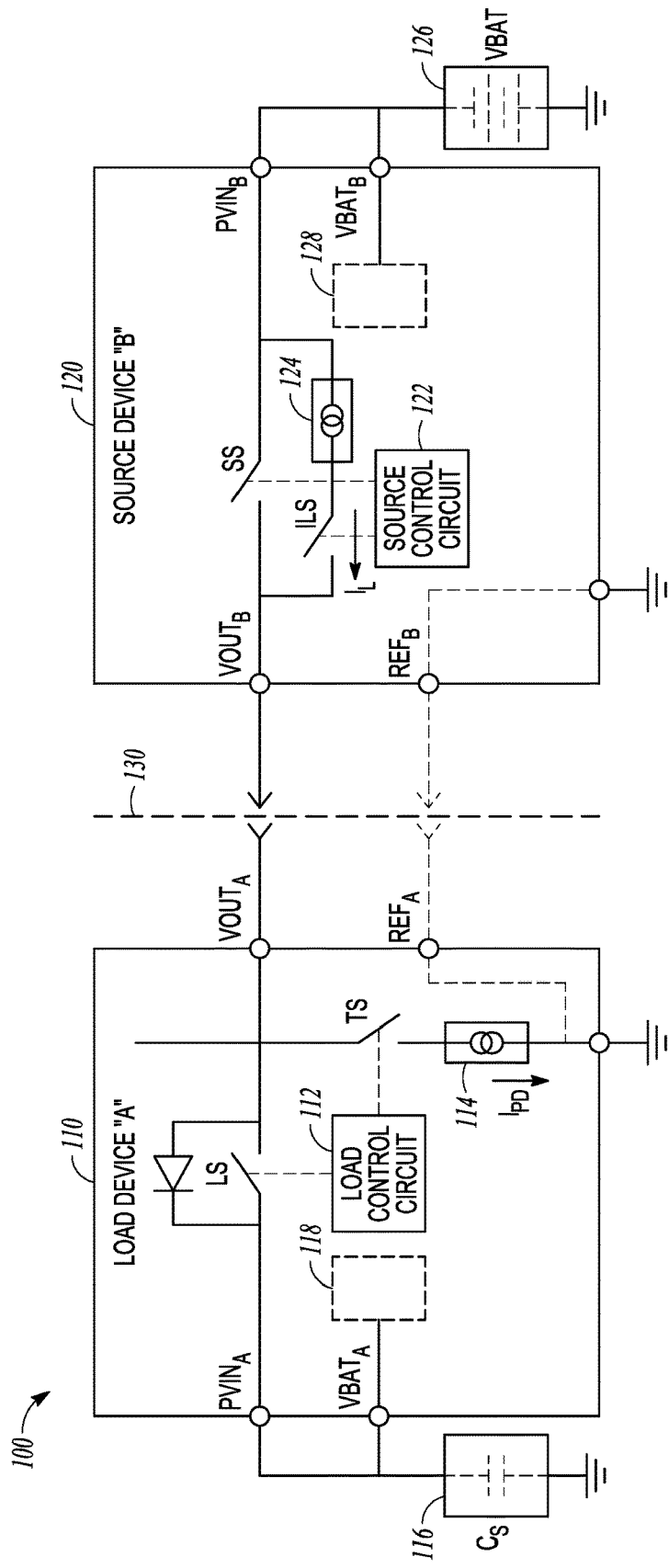
FIG. 1 illustrates generally an example comprising a system that can include a load device and a source device.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 illustrates generally an example comprising a system 100 that can include a load device 110 ("A") and a source device 120 ("B"). The source device can be coupled to an energy source 126, such as a battery (e.g., VBAT), capacitor, or power supply. The energy source 126 can establish a supply voltage at one or more nodes such as $PVIN_B$ or $VBAT_B$. For example, circuitry 128 in the source device can be supplied with operating energy by the energy source 126. The source device 120 can include a source control circuit 122, such as configured to control one or more switches such as a supply switch SS. A current-limited supply path can be established by the control circuit, such as by controlling a current limited path switch ILS, which can be located in series with a current limiting device 124 (e.g., an active or passive current limiting device such as a controlled current source). The source device can make energy provided by the energy source 126 available at a direct-current (DC) output node $VOUT_B$, such as by controlling one or more of the switches SS or ILS using the source control circuit.

In one approach, the source device 120 can deliver full available operating energy to the load device 110 upon physical connection between the source and load devices 110 and 120, such as when a DC input node, $VOUT_A$, to the load device 110 is connected to the DC output note $VOUT_B$ of the source device 120. However, the present inventors have recognized that such an approach can present challenges. For example, when $VOUT_B$ or one or more other nodes are made available through a hardware interface, a user may be able to physically connect various different kinds load devices. If a defective or unauthorized load device is connected, and the source device does not limit the available current at the supply node $VOUT_B$, one or more of the load or source devices could be damaged. In certain applications, regulatory limitations may exist with respect to voltages that can be present on exposed conductors, or limitations may exist regarding allowable leakage current, such as to maintain safety for users. For example, a leakage current may be specified to be on the order of 100 microamperes (µA) or less, as an illustrative example, in a medical application.

To address such challenges, the present inventors have recognized that a load device 110 can be configured to communicate with the source device 120 using a power supply node connection, such as through the power node connection between $VOUT_A$ and $VOUT_B$. As an illustrative example, the load device 110 can include a load switch LS. The load switch LS can be bridged by a rectifier D. In an initial operating state, the source device 120 can limit the available current supplied to the load device 110 such as using the switch ILS and current limiting device 124 to provide a specified current limit, such as represented by $I_L$. Such limited current $I_L$ can pass through the rectifier D to charge up another energy storage device 116 (such as a capacitor) comprising a portion of the load device 110 or coupled to the load device 110. A load control circuit 112 can be configured to power up even when only supplied by the limited output current from the source device 120, and can generate a communication signal such as by opening and closing a transmit switch TS to create a shunt between the DC input node $VOUT_A$ and a reference node.

The transmit switch TS can be coupled to another current limiting device such as a current sink 114, such as to regulate or limit the shunt "pull down" current. For example, $I_{PD}$ can be specified to exceed $I_L$ in magnitude, causing a voltage at VOUTA and VOUTB to sag during transmit events. The source device 120, operating a current-limited output mode, can detect a change in the DC supply output voltage at the DC output node VOUTB, such as to receive a communication signal established by the load device 110. The source device can enable the source switch SS, such as in response to communication provided by the load device 110.

In an illustrative example, the load device 110 can be identified by the source device 120, such as in response to detecting a specified authentication signal (e.g., a specified count or pattern of voltage pulses imposed by the transmit switch TS pulling down the DC supply voltage through the nodes VOUTA and VOUTB). As mentioned in relation to other examples described herein, a duration or other characteristics in transmit pull-down pulses can be specified such as to avoid discharging the energy storage device 116. However, the blocking behavior of the rectifier D will generally prevent the energy storage device 116 from discharging through the shunt path formed by the transmit switch TS. Generally, examples herein illustrate use of a specified count of transmit pulses to provide the authentication signal, but such examples are illustrative and other protocols can be used. For example, the transmit pulse duration need not be constant. For example, pulses having different durations can be used (such as a sequence of pulses including a shorter pulse and a longer pulse, or a specified pattern of pulses having different durations).

When the source device 120 closes the source switch SS, such as in response to receiving the authentication signal, the pull-down current $I_{PD}$ may no longer sufficient to pull down the node voltage at the DC supply input node VOUTA, or such a pull down can cause a voltage drop that is much smaller in magnitude than a voltage drop occurring during pull-down events when the source device 120 is operating the current-limited mode. Accordingly, the load device 110 can detect that $I_{PD}$ is no longer sufficient to pull down the voltage at $VOUT_A$ (or is no longer sufficient to cause $VOUT_A$ to sag below a specified voltage threshold), and the load device can then enable the load switch LS, permitting full operating current to other circuitry 108 within the load device 110. This behavior indicates to the load device 110 that the source device has changed states (e.g., switch SS is closed in the source device 120 to bypass the current-limited path through the current limiting device 124 and switch ILS).

Figure 2:
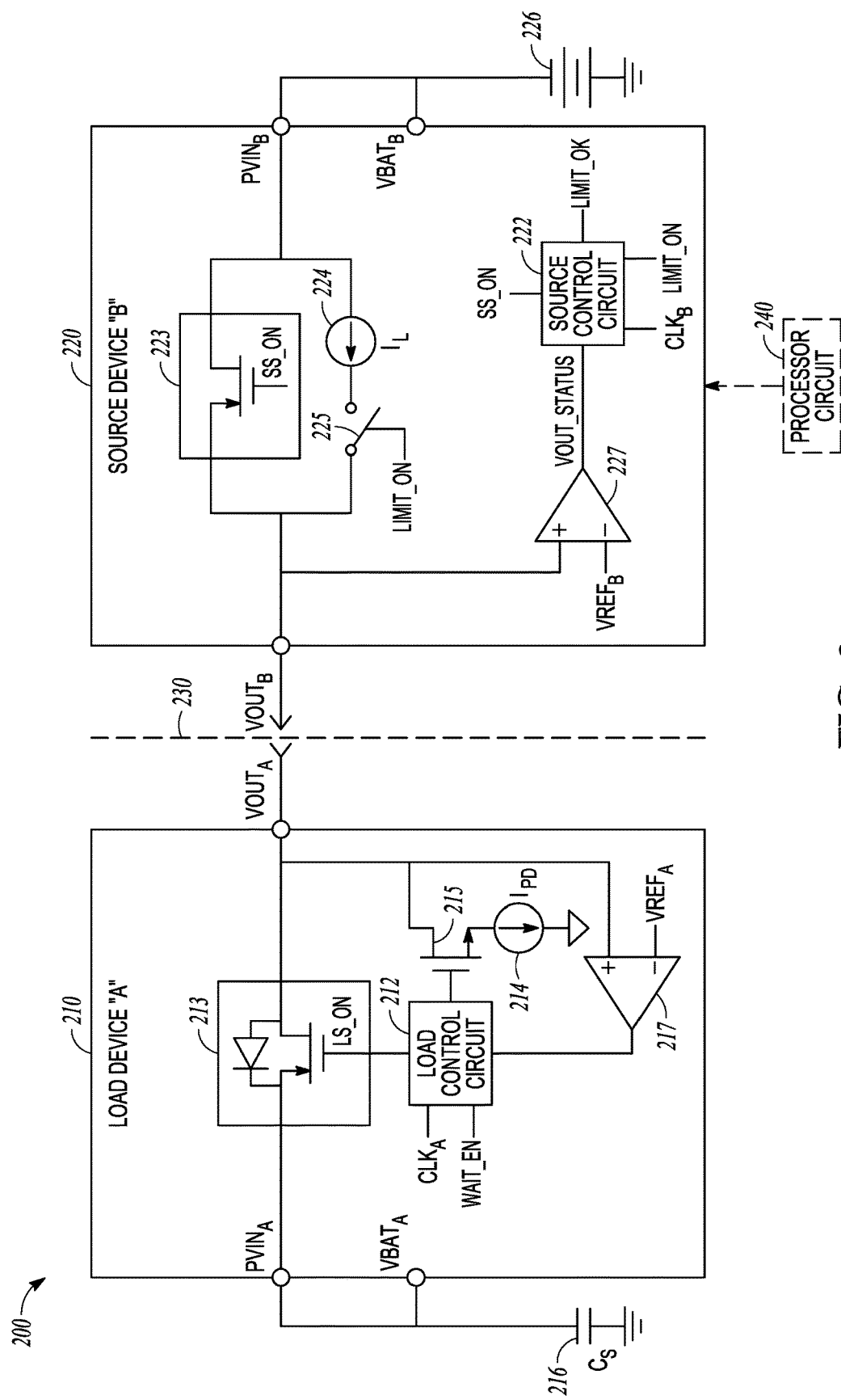
FIG. 2 illustrates generally another example comprising a system that can include a load device and a source device, similar to the example of FIG. 1.

FIG. 2 illustrates generally an illustrative example comprising a system that can include a load device 210 and a source device 220, similar to the example of FIG. 1. The source device 220 can include a source switch 223, such as comprising a transistor having a state controlled by an input signal, SS_ON. The transistor is shown as a field effect transistor (FET), but the source switch 223 can include one or more other types of switching devices such as a bipolar device, insulated gate bipolar transistor (IGBT), junction FET, or an electromechanical device such as a microelectromechanical switch. Similarly, a current limited path switch 225 can include a transistor or other device, such as having a state controlled by an input signal, LIMIT_ON. The current limited path switch 225 can be arranged in series with a current limiting device such as a current source 224 to limit the current between a node such as $PVIN_B$ or $VBAT_B$ and an output supply node $VOUT_B$ when the source switch 223 is open and the current limited path switch 225 is closed. A battery 226 or other energy source can be used to provide operating energy for the source device 220, and the source device 220 can control the current provided to the load device 210.

The load device 210 can include a load switch 213, such as including a transistor having a state controlled by an input signal, LS_ON. The transistor comprising the load switch 213 can be coupled to a rectifier, or a body diode established by the transistor itself can be arranged to permit current to flow from a DC input node $VOUT_A$ through the load switch 213 to an energy storage device 216 such as capacitor. As in other examples, the transistor 213 comprising the load switch need not include a FET, and can include one or more other types of switching devices. When the DC output node $VOUT_B$ of the source device 220 is connected to the DC input node $VOUT_A$ of the source device, a load control circuit 212 can be powered up, such as using the limited current $I_L$ provided by the source device 220 (and, under transient conditions, stored energy provided by the energy storage device 216). The load control circuit 212 can be coupled to a transmit switch 215, such as controlling the transmit switch 215 to provide a shunt pathway to modulate a voltage at $VOUT_A$. For example, the shunt pathway can include a current limiting device 214 such as to provide a specified pull-down current $I_{PD}$. The transmit switch 215 can be controlled to module $VOUT_A$ in a manner detectable by a source device comparator circuit 227.

The source device comparator circuit 227 can include inputs coupled to a $VOUT_B$ and a reference voltage $VREF_B$, as an illustrative example. An authentication signal such as comprising a specified count or pattern of modulation pulses can be imposed on $VOUT_A$ by the load device 210 and coupled to the comparator 227 input through $VOUT_B$, and an output signal VOUT_STATUS can be provided to a source control circuit 222. As mentioned above, the specific protocol of modulation pulses need not include a fixed count of pulses having a fixed duration. Other protocols can be used such as including a specified pattern of pulses, and such as including one or more pulses having a different duration than other pulses.

The source control circuit 222 can include various outputs such as SS_ON, LIMIT_ON, and LIMIT_OK, and a clock input, such as to receive a generated or recovered clock signal $CLK_B$. If a valid authentication signal is received through the power node $VOUT_B$, the source control circuit can assert SS_ON and enable sourcing of a higher current between the energy source 226 and $VOUT_B$ by closing the source switch 223. The source control circuit 222 can also de-assert LIMIT_ON such as to open the switch 225. Other control signals can be generated, such as a LIMIT_OK signal, indicating that a valid load device 110 has been detected.

The load device 210 can be configured to detect a change in supply output state of the source switch 223. For example, when the transmit switch 215 is closed, $I_{PD}$ can be inhibited from pulling a voltage at $VOUT_A$ down below a specified threshold because the current supplied by the source device 220 is larger than the pull down current limit $I_{PD}$. A load device comparator 217 can be used, such as compare a voltage at $VOUT_A$ with a reference voltage $VREF_A$. An output of the load device comparator 217 can be coupled to the load control circuit 212. For example, as described in relation to other examples herein, the load control circuit can assert a load switch control signal LS_ON, such as when one or more specified criteria are met. For example, if the load control circuit controls the transmit switch 215 to transmit, a counter can be incremented in response to each instance where the transmit pulses fail to pull down $VOUT_A$ below the threshold. When a specified count of transmit pulse attempts have been made, such as without $VOUT_A$ traversing the threshold, the load control circuit can assert LS_ON, as shown illustratively in the example of FIG. 3A. Other signals can be provided by the load control circuit 212, such as a WAIT_EN signal, indicating that the load control circuit 212 has not yet detected a supply output state change in the source device 220.

The source or load control circuits of FIG. 1 (e.g., circuits 112 or 122) or of FIG. 2 (e.g., circuits 212 or 222) can include a microcontroller, a microprocessor, a state machine, simple combinatorial or register-based logic, or a programmable logic device, as illustrative examples. Generally, for examples including ultra-low power consumption when operating in a current-limited mode (e.g., supplied by current $I_L$), the load control circuit 212 can be configured to operate at a power consumption level on the order of microwatts or fractions of a microwatt, as an illustrative example. Even if the load device 210 is configured to ultra low power consumption, the source device 220 need not be as power-consumption limited as the load device 210, and can include or can be coupled to a general-purpose processor circuit 240.

Figure 3A:
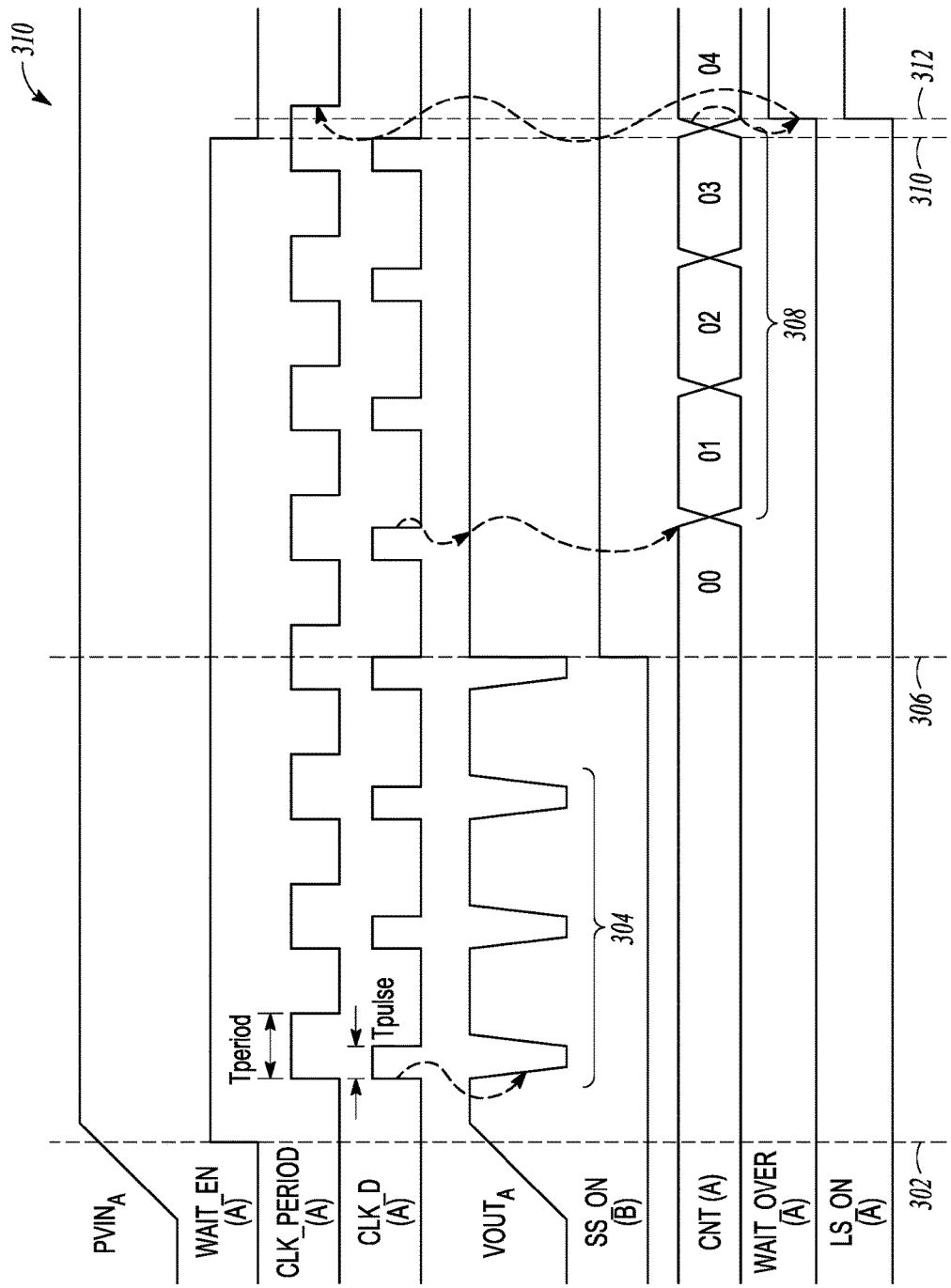
FIG. 3A illustrates generally an illustrative example comprising a signal timing diagram, such as representing various signals as can be provided or used by the system of FIG. 2, and such as primarily representing signals related to the load device.

FIG. 3A illustrates generally an illustrative example comprising a signal timing diagram 310, such as representing various signals as can be provided or used by the system of FIG. 2, and such as primarily representing signals related to the load device 210 of FIG. 2. Some time before 302, $VOUT_A$ can be energized, such as via a current-limited output from a source device. A rectifier can allow current to flow to $PVIN_A$, which will also ramp up. In response to one or more of $PVIN_A$ or $VOUT_A$ exceeding a specified threshold, WAIT_EN can be asserted. For example, WAIT_EN can inhibit operation of other portions of the load device. A clock signal can be generated, such as indicated by a CLK_PERIOD signal having on on-duration of period $T_{period}$, and within the CLK_PERIOD on-duration, a transmit pulse duration can be established using CLK_D, such as to provide transmit pulses (where $VOUT_A$ is to be pulled down) having duration $T_{pulse}$. Over the duration 304, such as when the source device is providing a limited supply current (e.g., $I_L$), the voltage at $VOUT_A$ will sag in response to transmit events.

The source switch control signal SS_ON is de-asserted during the duration 304, indicating that the source device is operating in current-limited initial state. At a later time 306, such as after a specified count or pattern of transmit pulses are provided (or some other protocol defining the transmit pulse characteristics comprising a valid authentication signal is met), the source device can assert SS_ON, such as enabling a higher-current output mode. Subsequent transmit pulses from the load device fail to create a detectable pulse at $VOUT_A$ (e.g., $VOUT_A$ pull-down is suppressed because SS_ON enables a higher output current from the source device).

Generally, the load device will have no direct indication that SS_ON has been asserted, but the load device can detect a change in the supply output state of the source device indirectly. For example, the load device can monitor $VOUT_A$, such as using a counter to count a number of transmit attempts where $VOUT_A$ fails to sag during transmit events, such as over a duration 308. After a specified count of transmit attempts have been made, such as at 310, the load device can de-assert WAIT_EN, and after a short delay, at 312 the load device can assert a signal WAIT_OVER, and can energize the load switch such as using a signal LS_ON.

Figure 3B:
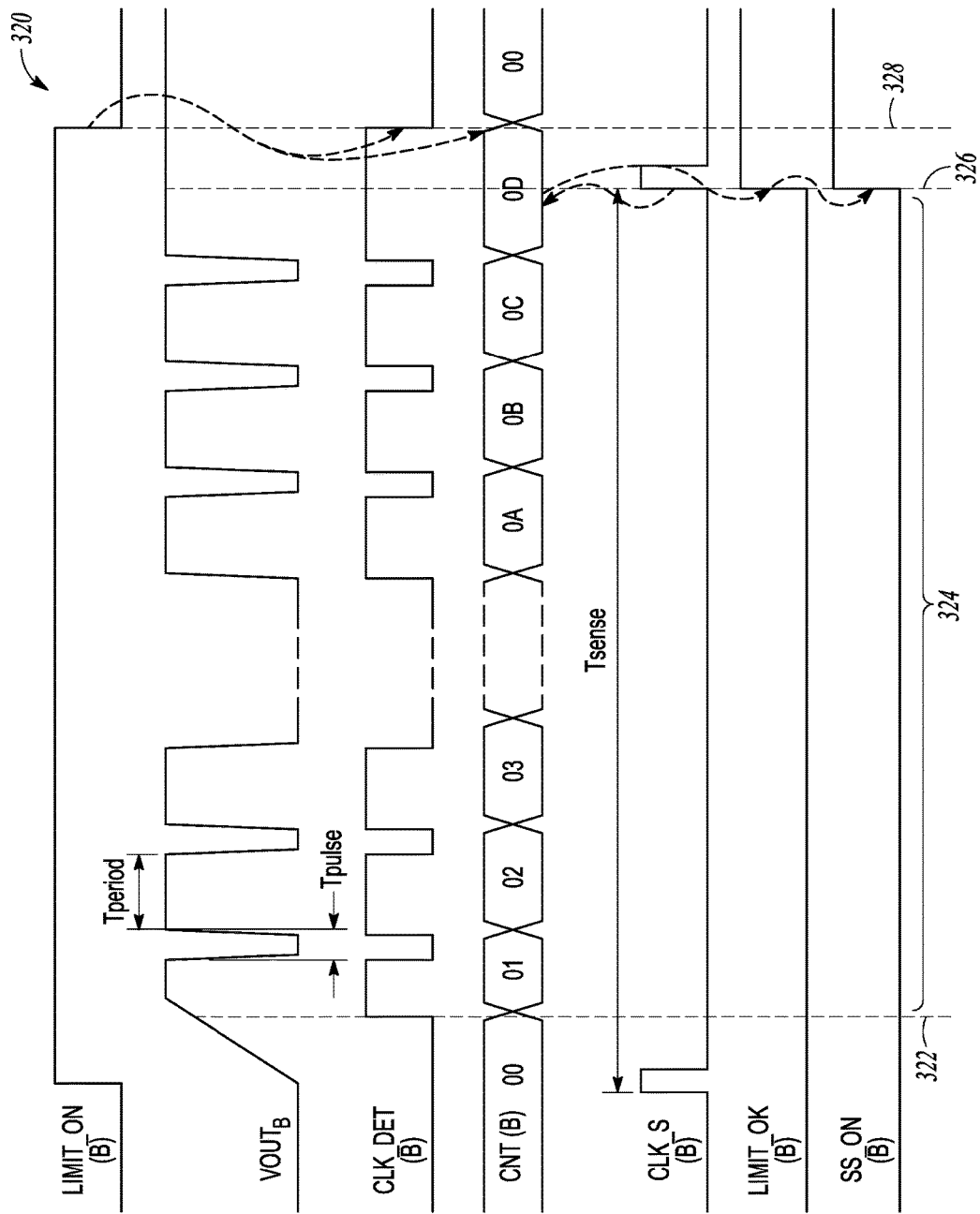
FIG. 3B illustrates generally another illustrative example comprising a signal timing diagram, such as representing various signals as can be provided or used by the system of FIG. 2, and such as primarily representing signals related to the source device.

FIG. 3B illustrates generally another illustrative example comprising a signal timing diagram 320, such as representing various signals as can be provided or used by the system of FIG. 2, and such as primarily representing signals related to the source device 220 of FIG. 2. Before or shortly after the load device is connected to the source device, LIMIT_ON can be asserted, such as to provide a current-limited output at $VOUT_B$ to supply the load device. $VOUT_B$ can gradually ramp up to a specified output voltage. At 322, such as after some portion of the circuitry in the load device is powered up by the current-limited output signal at $VOUT_B$, $VOUT_B$ can be pulled down by the load device, such as using one or more pulses having a specified pulse duration $T_{pulse}$. In an illustrative example, a counter can be used to count a number of specified edge or level transitions of a detected transmit pulse (such as detected pulses represented by the signal CLK_DET). For example, when the authentication signal provided by the load device includes providing a specified number of pulses, during 324 the source device can increment the counter every time a transmit pulse is received (as indicated by a pulse imposed on $VOUT_B$).

At 326, when a specified number of pulses (or a count of pulses within a specified range) is received, such as over sensing duration $T_{sense}$ established by CLK_S, SS_ON can be asserted, enabling a higher-current output mode of the source device. Later, such as at 328, an earlier-used current-limited output of the source device can be disabled such as by de-asserting LIMIT_ON. LIMIT_ON can be de-asserted after a specified duration when SS_ON is asserted, or LIMIT_ON can be de-asserted such as after detecting an absence of further transmit pulses between 326 and 328.

Timing or detection of events such as received transmit pulses, suppressed transmit pulses, or other events can include level-based triggering, edge triggering, or use of specified sampling windows. Clock signals need not be synchronized or recovered. For example, asynchronous clock signals can be used, where the source device and load device clocks are unsynchronized. To compensate for frequency variation between source and load device clocks, or instability, one or more criteria used for control can include use of valid ranges of pulse counts for authentication rather than a specific exact count. As an illustrative, a particular load device may be configured to transmit 10 pulses, and the source device may declare that the authentication signal is valid if a range of transmit pulses between 8 and 12 pulses is detected, or some other specified range.

If a pattern is used as an authentication signal, a count of several repetitions of the pattern can be used to authenticate the load device, or a certain specified number of bit errors can be tolerated while still declaring a transmit authentication signal to be valid, enabling unique detection of the load device in the presence of bit errors. Other variations on the transmit pulse protocol can be used and the examples herein are illustrative. As mentioned elsewhere herein, the authentication signal need not include pulses each having a single fixed duration. Differing pulse widths can be used such as encoding the authentication signal using pulse width modulation or other techniques.

In an example, the reference clock frequencies used for transmit pulse generation and detection can be slightly offset from each other. As an illustrative example, the load device clock frequency for transmission of the authentication signal can be established at about 900 Hertz, and the load device clock can be established at about 1100 Hertz.

Figure 4A:
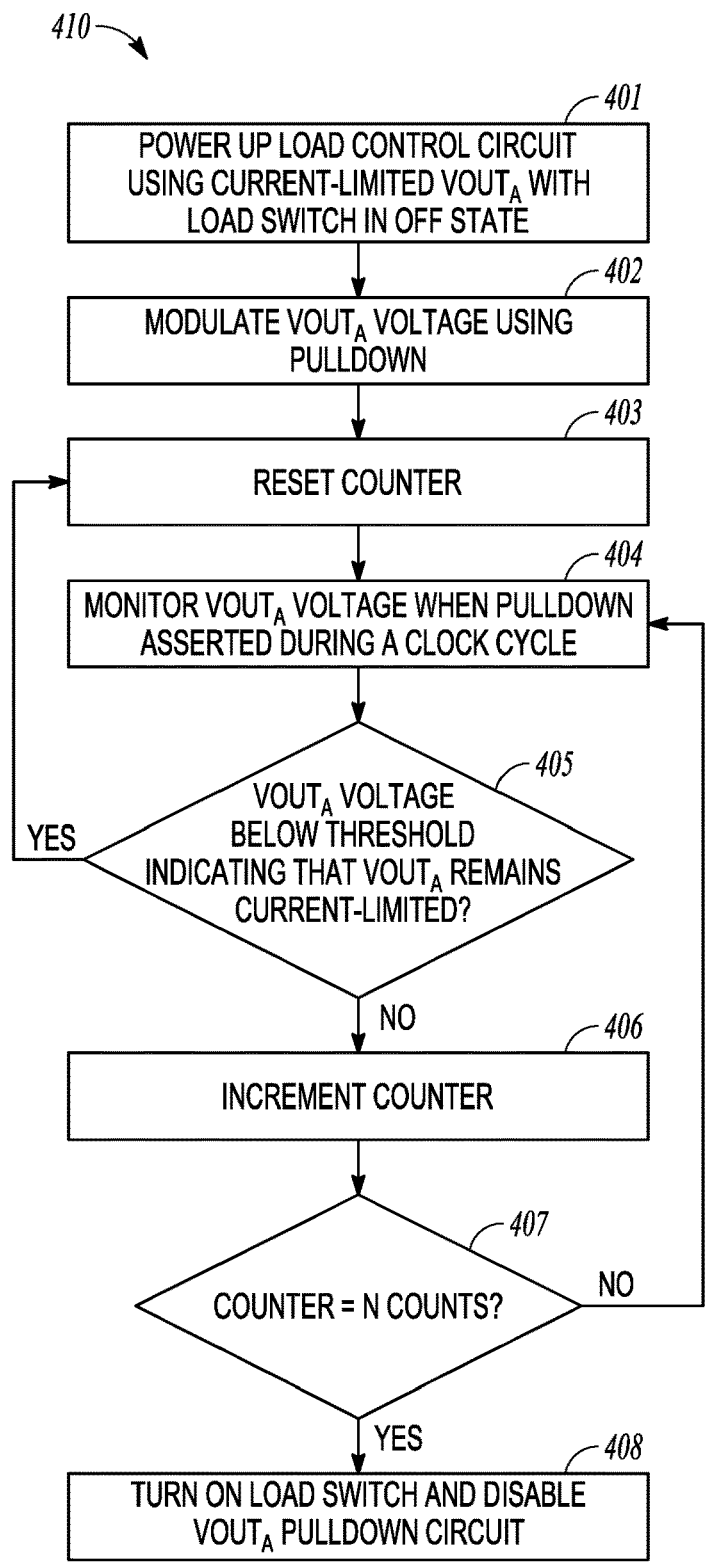
FIG. 4A illustrates generally a technique, such as a method, that can include controlling a load switch at least in part by monitoring a direct current (DC) supply input terminal.

FIG. 4A illustrates generally a technique 410, such as a method, that can include controlling a load switch at least in part by monitoring a direct current (DC) supply input terminal. At 401, a load control circuit can be powered up using a current-limited DC input supply input terminal $VOUT_A$, and a load switch included as a portion of a load device can be in the off state.

At 402, $VOUT_A$ can be modulated by the load device using a pull-down circuit as mentioned in relation to other examples herein, such as according to a specified protocol to generate an authentication signal by communicating using the $VOUT_A$ node. At 403, a counter can be reset or initialized. At 404, $VOUT_A$ can be monitored (such as using a comparator circuit) when a pull down is asserted during a clock cycle. At 405, If $VOUT_A$ voltage crosses or is below a specified threshold (e.g., transitioning from a "high" logic state to a "low" logic state), then $VOUT_A$ remains current-limited and the technique can revert back to 403, where the counter is reset. If $VOUT_A$ does not cross or is not below the specified threshold (e.g., $VOUT_A$ is inhibited from transitioning from logic "high" to logic "low"), then $VOUT_A$ is being supplied by the source device with a higher-current output (indicating that the source switch is closed), and at 406, the counter can be increment. At 407 if the counter does not indicate that N counts are registered, the technique can revert back to 404 to monitor VOUTA for another clock cycle. If N counts are registered, then at 408, the load switch can be turned on and the transmit pull-down circuit can be disabled or otherwise inhibited. The use of an up-counter is illustrative, and a down-counter arrangement can be used (e.g., starting with an initial state of N and decrementing to zero counts, for example).

Figure 4B:
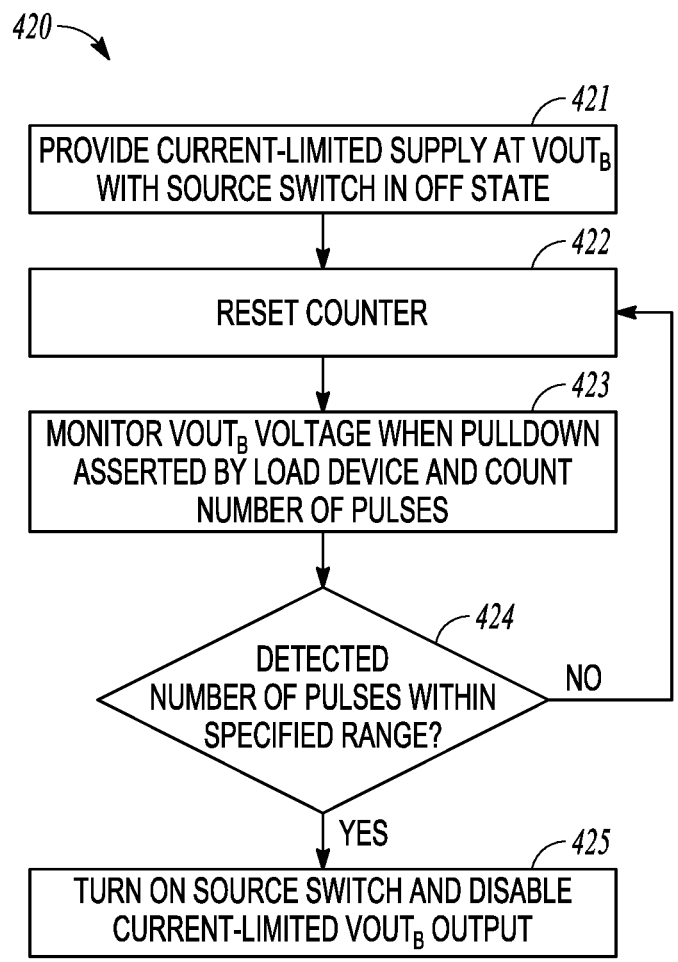
FIG. 4B illustrates generally a technique, such as a method, that can include providing a current-limited direct current (DC) supply output until one or more specified criteria are met, and, in response, turning on a source switch and disabling the current-limiting element.

FIG. 4B illustrates generally a technique 420, such as a method, that can include providing a current-limited direct current (DC) supply output until one or more specified criteria are met, and, in response, turning on a source switch and disabling the current-limiting element. At 421, a current-limited supply can be provided by a DC supply output node $VOUT_B$ by a source device, and a source switch providing a higher-current output can be in an off state. At 422, a counter can be reset or initialized.

A load device can be connected to the source device either before or after the current-limited supply output is established at $VOUT_B$. At 423, such as after the load device is at least partially powered up by the current-limited output, the source device can monitor $VOUT_B$ when a pull-down transmit signal is applied by the load device. A number of detected pull-down pulses can be counted. At 424, such as after some specified observation duration (e.g., $T_{sense}$), if the detected number of pulses (e.g., a pulse count) is within a specified range of pulses, then at 425 a source switch can be turned on and the current-limited output provided at 421 can be disabled or otherwise inhibited. If the specified number of pulses is not detected at 424, then at 422 the counter can be reset and $VOUT_B$ can be further monitored at 423. Such monitoring can be discontinued such as after a specified timeout or sensing duration. Monitoring can be re-established again later, or permanently suppressed, such as when the load device is not properly authenticated by receiving a specified count, a count within a specified range, or a specified pattern of transmit pulses.

Various Notes & Examples

Example 1 can include or use subject matter (such as an apparatus, a method, a means for performing acts, or a device readable medium including instructions that, when performed by the device, can cause the device to perform acts), such as can include or use an electronic circuit, comprising a direct current (DC) input terminal, an energy storage device; a first switch coupled between the DC input terminal and the energy storage device, a rectifier coupled across the first switch and oriented to permit current to flow from the DC input terminal across the first switch to charge the energy storage device but inhibiting current flow in the opposite direction; a second switch coupled between the DC input terminal and a reference node, a load control circuit configured to sense application of a supply voltage to the DC input terminal and, in response, modulate the supplied voltage using the second switch to shunt current between the DC terminal and the reference node to provide an authentication signal to a source of the supply voltage provided at the DC input terminal and compare the supply voltage at the DC input terminal to a reference voltage when the second switch is closed and, in response, to control the first switch to close, energizing other portions of the electronic circuit when the input current provided the DC input terminal is sufficient to power the other portions of the electronic circuit as indicated at least in part by the comparison.

In Example 2, the subject matter of Example 1 optionally includes that the load control circuit configured to control the second switch to generate one or more pulses having a specified transmit pulse duration.

In Example 3, the subject matter of Example 2 optionally includes a comparator, the load control circuit comprising a counter circuit configured to count a number of transmission pulse durations where the supply voltage at the DC input terminal fails to droop more than a specified amount as indicated by the comparator, and the load control circuit configured to control the first switch to close when the counter reaches a specified count.

In Example 4, the subject matter of any one or more of Examples 2-3 optionally includes that the load control circuit is configured to provide the authentication signal including generating a specified count of transmit pulses having the specified transmit pulse duration.

In Example 5, the subject matter of any one or more of Examples 2-4 optionally includes that the specified transmit pulse duration is specified to be short enough in duration to maintain a sufficient charge in the energy storage device to power the load control circuit.

In Example 6, the subject matter of any one or more of Examples 1-5 optionally includes a shunt current established by the second switch limited using a current-limiting circuit.

In Example 7, the subject matter of any one or more of Examples 1-6 optionally includes that the load control circuit is configured to operate with the first switch open using a DC input current that is less than an operating current consumed by the electronic circuit when the first switch is closed.

In Example 8, the subject matter of any one or more of Examples 1-7 optionally includes that the first switch comprises a transistor and that the second switch comprises a transistor.

In Example 9, the subject matter of Example 8 optionally includes that the rectifier comprises a body diode established by the transistor.

Example 10 can include, or can optionally be combined with the subject matter of one or any combination of Examples 1 through 9 to include, subject matter (such as an apparatus, a method, a means for performing acts, or a machine readable medium including instructions that, when performed by the machine, that can cause the machine to perform acts), such as can include an electronic circuit, comprising a direct current (DC) output terminal, an energy storage device, a first switch coupled between the DC output terminal and the energy storage device, a second switch arranged to couple the DC output terminal to the energy storage device through a current limiting circuit, a source control circuit configured to provide a current-limited DC output voltage to the DC output terminal using the second switch and the current limiting circuit and monitor the current-limited DC output voltage to detect an authentication signal provided at the DC output terminal by a load circuit, the load circuit configured to modulate the voltage at the DC output terminal using a pull-down circuit, and in response to detecting the authentication signal provided by the load circuit, close the first switch to bypass the current limiting circuit.

In Example 11, the subject matter of Example 10 optionally includes that in response to detecting the authentication signal provided by the load circuit, the source control circuit is configured to open the second switch inhibiting the current limiting by the current limiting circuit.

In Example 12, the subject matter of any one or more of Examples 10-11 optionally includes a comparator, the source control circuit including a counter, the source control circuit configured to monitor the DC output voltage using the comparator to detect pulses applied to the DC output terminal by the pull-down circuit, and the source control circuit is configured to increment the counter when a pulse is detected as indicated by the comparator.

In Example 13, the subject matter of Example 12 optionally includes that the authentication signal comprises a specified count of pulses.

In Example 14, the subject matter of Example 13 optionally includes that the source control circuit is configured to detect the authentication signal by comparing a detected count of pulses against a specified acceptable range of counts.

In Example 15, the subject matter of any one or more of Examples 10-14 optionally include that the source control circuit is configured to detect the authentication signal at least in part using a clock signal that is generated asynchronously to a clock signal used by the load circuit to generate the authentication signal.

In Example 16, the subject matter of any one or more of Examples 10-15 optionally includes that the first switch comprises a transistor and that the second switch comprises a transistor.

Example 17 can include, or can optionally be combined with the subject matter of one or any combination of Examples 1 through 16 to include, subject matter (such as an apparatus, a method, a means for performing acts, or a machine readable medium including instructions that, when performed by the machine, that can cause the machine to perform acts), such as can include load circuit comprising a direct current (DC) input terminal, a source circuit comprising a direct current (DC) output terminal coupled to the DC input terminal of the load circuit. The source circuit can include a first energy storage device; a source switch coupled between the DC output terminal and the first energy storage device, a current limiting switch arranged to couple the DC output terminal to the first energy storage device through a current limiting circuit, a source control circuit configured to provide a current-limited DC output voltage to the DC output terminal using the second switch and the current limiting circuit and monitor the current-limited DC output voltage to detect an authentication signal provided at the DC output terminal by the load circuit. The load circuit can be configured to modulate the voltage at the DC output terminal using a pull-down circuit. In response to detecting the authentication signal provided by the load circuit, the source control circuit can be configured to close the first switch to bypass the current limiting circuit. The load circuit can include a second energy storage device having an energy storage capacity less than the first energy storage device, a load switch coupled between the DC input terminal and the energy storage device, a rectifier coupled across the load switch and oriented to permit current to flow from the DC input terminal across the load switch to charge the energy storage device but inhibiting current flow in the opposite direction, a transmit switch coupled between the DC input terminal and a reference node, and a load control circuit configured to sense application of a supply voltage to the DC input terminal and in response, modulate the supplied voltage using the pull-down circuit comprising the second switch to shunt current between the DC terminal and the reference node to provide the authentication signal, and compare the supply voltage at the DC input terminal to a reference voltage when the transmit switch is closed and, in response, to control the load switch to close, energizing other portions of the load circuit when the input current provided the DC input terminal is sufficient to power the other portions of the load circuit as indicated at least in part by the comparison.

In Example 18, the subject matter of Example 17 optionally includes that the first energy storage device comprises a battery and that the second energy storage device comprises a capacitor.

In Example 19, the subject matter of any one or more of Examples 17-18 optionally includes that the DC output terminal and the DC input terminal each define electrical interconnects to provide a coupling between the DC output terminal and the DC input terminal; and wherein the source control circuit is configured to enable the current-limited DC output voltage upon detection of electrical coupling between the DC output terminal and DC input terminal.

In Example 20, the subject matter of any one or more of Examples 17-19 optionally includes that the load switch, transmit switch, and load control circuit are co-integrated in a first integrated circuit and that the source switch, current limiting switch, and source control circuit are co-integrated in a second integrated circuit.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An electronic circuit, comprising:
a source circuit, comprising:
   a direct current (DC) output terminal;
   a current limiting circuit; and
   a source control circuit configured to provide a current-limited DC output voltage to the DC output terminal using the current limiting circuit and configured to monitor the current-limited DC output voltage to detect a coded authentication signal generated by a load circuit and imposed at the DC output terminal by the load circuit, and in response to detecting the coded authentication signal imposed by the load circuit, the source control circuit configured to bypass the current limiting circuit.

2. The electronic circuit of claim 1, wherein in response to detecting the authentication signal imposed by the load circuit, the source control circuit is configured to inhibit the current limiting by the current limiting circuit.

3. The electronic circuit of claim 1, comprising a comparator; and
wherein the source control circuit includes a counter;
wherein the source control circuit is configured to monitor the DC output voltage using the comparator to detect pulses imposed at the DC output terminal by the load circuit; and
wherein the source control circuit is configured to increment the counter when a pulse is detected as indicated by the comparator.

4. The electronic circuit of claim 3, wherein the coded authentication signal comprises a specified count of pulses.

5. The electronic circuit of claim 4, wherein the source control circuit is configured to detect the coded authentication signal by comparing a detected count of pulses against a specified acceptable range of counts.

6. The electronic circuit of claim 1, wherein the source control circuit is configured to detect the coded authentication signal at least in part using a clock signal that is generated asynchronously to a clock signal used by the load circuit to generate the coded authentication signal.

7. The electronic circuit of claim 1, wherein the source control circuit is configured to bypass the current limiting circuit using a first switch comprising a transistor.

8. The electronic circuit of claim 1, further comprising the load circuit, and wherein the load circuit comprises:
   a direct current (DC) input terminal;
   an energy storage device;
   a rectifier oriented to permit current to flow from the DC input terminal to charge the energy storage device but inhibiting current flow in the opposite direction; and
   a load control circuit configured to sense application of a supply voltage to the DC input terminal and, in response, modulate the supplied voltage by shunting current between the DC terminal and a reference node to impose the coded authentication signal at the DC input terminal, and the load circuit configured to monitor the supply voltage at the DC input terminal and, in response, to energize other portions of the electronic circuit when the input current provided the DC input terminal is sufficient to power the other portions of the electronic circuit as indicated at least in part by the monitoring.

9. The electronic circuit of claim 8, wherein the load control circuit is configured to impose the coded authentication signal by modulating the supplied voltage to generate one or more pulses having a specified transmit pulse duration.

10. The electronic circuit of claim 9, wherein the load control circuit is configured to impose the coded authentication signal including generating a specified count of transmit pulses having the specified transmit pulse duration.

11. The electronic circuit of claim 9, wherein the specified transmit pulse duration is specified to be short enough in duration to maintain a sufficient charge in the energy storage device to power the load control circuit.

12. A system, comprising:
a load circuit comprising a direct current (DC) input terminal;
a source circuit comprising:
   a direct current (DC) output terminal coupled to the DC input terminal of the load circuit;
   a current limiting circuit; and
   a source control circuit configured to provide a current-limited DC output voltage to the DC output terminal using the current limiting circuit and configured to monitor the current-limited DC output voltage to detect a coded authentication signal generated by the load circuit and imposed at the DC output terminal by the load circuit, and in response to detecting the coded authentication signal imposed by the load circuit, the source control circuit configured to bypass the current limiting circuit; and
   wherein the load circuit is configured to sense application of a supply voltage to the DC input terminal and, in response, modulate the supplied voltage by shunting current between the DC terminal and a reference node to impose the coded authentication signal and compare the supply voltage at the DC input terminal to a reference voltage, and, in response, the load circuit configured to energize other portions of the load circuit when the input current provided the DC input terminal is sufficient to power the other portions of the load circuit as indicated at least in part by the comparison.

13. The system of claim 12, wherein the source circuit comprises a battery; and
wherein the load circuit comprises a capacitor.

14. The system of claim 12, wherein the DC output terminal and the DC input terminal each define electrical interconnects to provide a coupling between the DC output terminal and the DC input terminal; and wherein the source control circuit is configured to enable the current-limited DC output voltage upon detection of electrical coupling between the DC output terminal and DC input terminal.

15. The system of claim 12, wherein source circuit comprises a first integrated circuit; and wherein the load circuit comprises a second integrated circuit.

16. An electronic circuit, comprising:

a means for providing a current-limited DC output voltage to a DC output terminal of a source circuit comprising a current limiting circuit;

a means for monitoring the current-limited DC output voltage to detect a coded authentication signal imposed at the DC output terminal by a load circuit; and in response to detecting the authentication signal imposed by the load circuit, a means for bypassing the current limiting circuit.

17. The electronic circuit of claim 16, comprising a means for monitoring the DC output voltage to detect pulses applied to the DC output terminal by the pull-down circuit; and in response, incrementing a counter when a pulse is detected.

18. The electronic circuit of claim 17, wherein the coded authentication signal comprises a specified count of pulses.

19. The electronic circuit of claim 18, wherein the means for detecting the coded authentication signal comprises a means for comparing a detected count of pulses against a specified acceptable range of counts.

20. The electronic circuit of claim 16, wherein the means for detecting the coded authentication signal includes a means for using a clock signal that is generated asynchronously to a clock signal used by the load circuit to generate the authentication signal.

\* \* \* \* \*